United States Patent [19]

Fuchs et al.

[11] Patent Number: 5,236,685
[45] Date of Patent: Aug. 17, 1993

[54] PREPARATION OF HYDROXYLAMMONIUM SALTS

[75] Inventors: Hugo Fuchs, Ludwigshafen; Franz-Josef Weiss, Neuhofen; Josef Ritz, Ludwigshafen, all of Fed. Rep. of Germany

[73] Assignee: BASF Aktiengesellschaft, Ludwigshafen, Fed. Rep. of Germany

[21] Appl. No.: 919,334

[22] Filed: Jul. 27, 1992

[30] Foreign Application Priority Data

Aug. 2, 1991 [DE] Fed. Rep. of Germany ....... 4125599

[51] Int. Cl.$^5$ .............................................. C01B 21/20
[52] U.S. Cl. ..................................... 423/387; 423/388
[58] Field of Search ................................ 423/387, 388

[56] References Cited

U.S. PATENT DOCUMENTS

| | | |
|---|---|---|
| 2,823,101 | 2/1958 | Jockers et al. . |
| 3,060,133 | 10/1962 | Jockers et al. ........................ 423/387 |
| 3,649,170 | 3/1972 | Heine et al. ........................... 423/387 |
| 3,767,758 | 10/1973 | Mars et al. ............................ 423/387 |
| 3,856,924 | 12/1974 | Kartte et al. . |

FOREIGN PATENT DOCUMENTS

| | | | |
|---|---|---|---|
| 7703020 | 9/1978 | Netherlands ........................ 423/387 |
| 772670 | 4/1957 | United Kingdom ................ 423/387 |

*Primary Examiner*—Wayne Langel
*Attorney, Agent, or Firm*—Keil & Weinkauf

[57] ABSTRACT

A process for the preparation of hydroxylammonium salts by the reduction of nitrogen oxide (NO) with hydrogen in dilute aqueous mineral acid in the presence of a suspended platinum catalyst which is partially poisoned with arsenic, at elevated temperature, wherein the catalyst used is one which has been produced by precipitation of metallic platinum from an aqueous solution on to a suspended support in the presence of an oxidic arsenic compound, by means of a reducing agent.

2 Claims, No Drawings

PREPARATION OF HYDROXYLAMMONIUM SALTS

Hydroxylammonium salts are manufactured on an industrial scale by the reduction of nitrogen oxide (NO) with hydrogen in the presence of suspended platinum catalyst in aqueous mineral acid. A large number of tests has been carried out with the aim of influencing the activity of the platinum catalyst used so as to improve the selectivity of the reduction of nitrogen oxide in the direction of hydroxyl ammonium salts whilst suppressing reduction thereof in the direction of by-products such as ammonium salts and nitrous oxide ($N_2O$).

DE-PS 956,038 has disclosed that platinum catalysts can be treated with poisoning agents such as sulfur, selenium, tellurium, arsenic, antimony, and bismuth, in order to encourage the formation of hydroxylammonium salts. However, the selectivities achieved are highly unsatisfactory, and no reference is made to the formation of nitrous oxide.

In a process described in U.S. Pat. No. 3,856,924, hydroxylammonium nitrate is prepared using a sulfur-poisoned platinum catalyst. This increases the selectivity to 86.5%, but the content of nitrous oxide in the off-gas is 15.5% v/v.

It is thus an object of the invention to provide a process for the preparation of hydroxylammonium salts by the catalytic reduction of nitrogen oxide in which very high selectivities are achieved with minimum formation of by-products such as ammonium salts and nitrous oxide.

This object is achieved in a process for the preparation of hydroxylammonium salts by the reduction of nitrogen oxide (NO) with hydrogen in dilute aqueous mineral acid in the presence of a suspended platinum catalyst which is partially poisoned with arsenic, at elevated temperature, wherein the catalyst used is one which has been produced by concurrent precipitation of metallic platinum and arsenic from an aqueous solution of a platinum compound on to a suspended support in the presence of an oxidic arsenic compound, by means of a reducing agent.

Our novel process has the advantage of maximizing the selectivity and minimizing the formation of ammonium compounds and nitrous oxide.

It is usual to maintain a molar ratio of hydrogen to nitrogen of from 1.5:1 to 6:1. Particularly good results are achieved when the molar ratio of hydrogen to nitrogen in the reaction zone is controlled so as to be within the range of from 3.5:1 to 5:1.

The acid used is advantageously a strong mineral acid such as hydrochloric, nitric, sulfuric, or phosphoric acid. Also suitable are the salts thereof, for example ammonium bisulfate. We particularly prefer to use sulfuric acid, ammonium bisulfate, or nitric acid. The reaction is usually started with 4N to 6N aqueous acid, and the acid concentration is not allowed to drop below 0.2N during the reaction.

The reaction is advantageously carried out at temperatures from 30° to 80° C. Particularly good results have been achieved with temperatures ranging from 40° to 60° C. The reaction is usually carried out under atmospheric or elevated pressure, e.g., a pressure of up to 30 bar. Particularly good results have been attained by carrying out the reaction under an elevated pressure of, say, from 1.5 to 20 bar.

The reaction is carried out in the presence of a supported platinum catalyst. Particularly good results have been achieved using platinum on carbon, e.g., activated charcoal, or especially graphite. Such a catalyst preferably has a platinum content of from 0.1 to 5% w/w and more preferably from 0.3 to 0.6% w/w. It is advantageous to use a supported platinum catalyst which contains less than 10% w/w of particles below 10 $\mu$m. It is preferred to use a supported platinum catalyst having particle sizes ranging from 30 to 90 $\mu$m. The fines can be readily removed by suitable means, for example sifting.

The supported platinum catalyst used is partially poisoned with arsenic. The content of arsenic is advantageously from 1 to 50% atomic and preferably from 3 to 30% atomic, based on the platinum metal used.

According to the invention, the catalyst used is one which has been prepared by the precipitation of metallic platinum from an aqueous solution containing a platinum compound and also an oxidic arsenic compound, on to a suspended catalyst support, preferably graphite, by means of a reducing agent. The starting solution for this operation is usually an aqueous solution of hexachloroplatinic acid or tetrachloroplatinic acid or salts thereof. To this aqueous solution there is added an oxidic arsenic compound, for example arsenic trioxide or arsenic pentoxide, preferably, arsenic trioxide. This arsenic compound is advantageously dissolved in said aqueous solution. Good results are achieved by adjusting the pH of the solution to from 4.6 to 6 by the addition of, say, an alkali metal hydroxide, before the solution is further processed. We prefer to buffer the solution to said pH range, for example by the additional use of alkali metal acetates.

The support material for the catalyst is suspended in the solution containing the platinum and arsenic compounds. The support material may be added to the solution when the latter is made up or at some later point prior to precipitation of the dissolved platinum. It has been found to be advantageous to suspend the support material in the platiniferous aqueous solution when the latter is made up. Metallic platinum is precipitated on to the support material by means of reducing agents capable of reducing chemically combined platinum to metallic platinum. Examples of suitable reducing agents are hydrazine, formaldehyde, and, in particular, formic acid. Advantageously, from 100 to 1000 moles of reducing agent are used for each gram atom of platinum. The reduction to metallic platinum is advantageously carried out at a temperature of from 60° to 90° C. On completion of the reduction, the suspended catalyst is filtered off and advantageously washed with water. Particularly good results have been achieved by subsequently treating the catalyst with an alkanol having a carbon number of from 1 to 5, e.g., methanol, ethanol, propanol, and isopropanol, at a temperature of, say, from 10° to 40° C. and preferably at room temperature, for from 5 to 60 minutes, following which treatment the alcohol is separated off, for example by filtration, and the catalyst is again washed with water.

It has been found to be particularly useful, when manufacturing hydroxylammonium nitrate, to suspend the catalyst in water before the reaction is commenced and then to carry out the treatment with hydrogen and maintain a concentration of nitric acid of from 1 to 2 equivalents per liter during the reaction by adding nitric acid and to allow the concentration of free acid to fall to from 0.2N to 0.3N once the reaction is complete. Hydroxylammonium salts are intermediates for the manufacture of oximes, e.g., cyclohexanone oxime, an important starting point for caprolactam.

The process of the invention is illustrated below with reference to the following examples.

EXAMPLE 1

A) Preparation of Catalyst 640 g of graphite are cleaned twice with 10% strength $HNO_3$ at room temperature and then dried and stirred overnight at 80° C. together with 500 ml of water, 75 ml of aqua regia and 43 g of $H_2O(PtCl_6).6H_2O$ (12.8 g of platinum), under a blanket of nitrogen.

On the following day, the mixture is diluted with 400 ml of $H_2O$ and reheated to 80° C. 1.69 g of arsenic trioxide (1.28 g of arsenic) are added and the mixture is neutralized with soda to a pH of 5.2 and buffered with sodium actetate. 240 ml of 99% formic acid are then added to precipitate the platinum and arsenic on to the graphite support, after which the catalyst thus formed is filtered off and washed to neutrality with water. The catalyst is then stirred with isopropanol for 30 minutes at room temperature, filtered off, and rewashed with water.

B) Manufacture of Hydroxylammonium Nitrate Solution 180 g of the platinum-on-graphite catalyst prepared as described above are suspended in 3500 ml of distilled water in a stirred autoclave of stainless steel. Following activation of the catalyst with hydrogen at 40° C., 400 ml of 65% $HNO_3$ are added, and a mixture of 63% v/v of $H_2$ (purity 99.9%) and 37% v/v of NO (purity 99.5%, remainder $N_2$) is passed through at the rate of 175 l(S.T.P.) per hour. By adding a further 800 ml of 65% $HNO_3$, the concentration of free acid is kept at from 1.3N to 1.5N.

After a total of 670 l(S.T.P.) of the $NO/H_2$ mixture has been fed to the autoclave, there are obtained 4.6 l of a hydroxylammonium nitrate solution containing 31.5 g/l of free $HNO_3$, 65.0 g/l of $NH_2OH$ (as $NH_3OHNO_3$), and 0.7 g/l of $NH_3$, chemically combined as $NH_4NO_3$. A total of 162 l(S.T.P.) of off-gas occurs, this containing 82.8% v/v of $H_2$, 13.4% v/v of NO, 2.3% v/v of $N_2O$, and 1.5% v/v of $N_2$.

The selectivity for hydroxylamine is calculated on the weight of NO converted and is 91.7%.

EXAMPLE 2

A) Preparation of Catalyst

The platinum/arsenic catalyst is prepared as described in Example 1.

B) Manufacture of Hydroxylammonium Sulfate Solution 50 g of the platinum/arsenic catalyst are suspended in 1250 ml of 4.3N sulfuric acid in a stirred autoclave of glass. Following activation of the catalyst with hydrogen at 40° C., a mixture of 63% v/v of $H_2$ (purity 99.9%) and 37% v/v of NO (purity 99.5%, remainder $N_2$) is passed through at the rate of 65 l(S.T.P.) per hour. The reaction temperature is kept at 40°–41° C. After a total of 200 l(S.T.P.) of the $NO/H_2$ mixture has been fed to the autoclave, there are obtained 1.33 l of a hydroxylammonium sulfate solution containing 104.9 g/l of free $H_2SO_4$, 62.0 g/l of $NH_2OH$ [as $(NH_3OH)_2SO_4$], and 0.36 g/l of $NH_3$, chemically combined as $(NH_4)_2SO_4$. A total of 50 l of off-gas occurs, this containing 79.2% v/v of $H_2$, 19.2% v/v of NO, 1.2% v/v of $N_2O$, remainder $N_2$. The selectivity for $NH_2OH$ is calculated on the weight of NO converted and is 96.5%.

EXAMPLE 3

(Comparative Example)

A) Preparation of Catalyst 640 g of graphite are cleaned twice with 10% strength nitric acid at room temperature and then dried and stirred overnight at 80° C. together with 500 ml of water, 75 ml of aqua regia and 8.5 g of $H_2(PtCl_6).6H_2O$ (3.2 g of platinum), under a blanket of nitrogen.

On the following day, the mixture is diluted with 400 ml of water and reheated to 80° C. The mixture is neutralized with soda to a pH of 5.2 and buffered with sodium actetate. The $Pt^{4+}$ is then reduced to $Pt^{2+}$ with sufficient sodium dithionite solution plus an excess of 15% of the required amount.

100 ml of 99% formic acid are then added to precipitate the platinum on to the graphite support, after which the catalyst thus formed is filtered off and washed to neutrality with water.

B) Manufacture of Hydroxylammonium Sulfate Solution 20 g of the platinum catalyst are suspended in 5000 ml of 4.3N sulfuric acid in a stirred autoclave of stainless steel. Following activation of the catalyst with hydrogen at 40° C., a mixture of 63% v/v of $H_2$ (purity 99.9%) and 37% v/v of NO (purity 99.5%, remainder $N_2$) is passed through at the rate of 212 l(S.T.P.) per hour. The reaction temperature is kept at 40°–42° C. After a total of 848 l(S.T.P.) of the $NO/H_2$ mixture has been fed to the autoclave, there are obtained 5.3 l of a hydroxylammonium sulfate solution containing 90.9 g/l of free $H_2SO_4$, 62.0 g/l of $NH_2OH$ [as $(NH_3OH)_2SO_4$], and 3.57 g/l of $NH_3$, chemically combined as $(NH_4)_2SO_4$. A total of 192 l of off-gas occurs, this containing 77.8% v/v of $H_2$, 17.0% v/v of NO, 1.9% v/v of $N_2O$, remainder $N_2$. The selectivity for $NH_2OH$ is calculated on the weight of NO converted and is 89.2%.

We claim:

1. In a process for preparing hydroxylammonium salts by the reduction of nitrogen oxide (NO) with hydrogen in dilute aqueous mineral acid in the presence of a suspended platinum catalyst which is prepared by precipitating metallic platinum from an aqueous solution of platinum salts onto a suspended support in the presence of an oxidic arsenic compound by means of a reducing agent yielding a partially poisoned catalyst, the improvement which comprises treating the catalyst with an alkanol containing 1 to 5 carbon atoms, and subsequently suspending the catalyst with hydrogen gas in water before the process is commenced.

2. A process as claimed in claim 1 which further comprises buffering the aqueous solution of platinum salts to pH 4.6 to 6 prior to reduction.

* * * * *